(12) United States Patent
Akutsu et al.

(10) Patent No.: US 9,475,926 B2
(45) Date of Patent: Oct. 25, 2016

(54) POLYETHYLENE RESIN COMPOSITION AND CONTAINERS USING THE SAME

(71) Applicant: TOYO SEIKAN GROUP HOLDINGS, LTD., Tokyo (JP)

(72) Inventors: Yosuke Akutsu, Kanagawa (JP); Takayuki Ishihara, Kanagawa (JP); Ikuo Komatsu, Kanagawa (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 198 days.

(21) Appl. No.: 14/352,413

(22) PCT Filed: Oct. 31, 2012

(86) PCT No.: PCT/JP2012/078167
§ 371 (c)(1),
(2) Date: Apr. 17, 2014

(87) PCT Pub. No.: WO2013/065735
PCT Pub. Date: May 10, 2013

(65) Prior Publication Data
US 2014/0309348 A1    Oct. 16, 2014

(30) Foreign Application Priority Data

Oct. 31, 2011 (JP) ................................. 2011-239631

(51) Int. Cl.
*C08L 23/06* (2006.01)

(52) U.S. Cl.
CPC ............ *C08L 23/06* (2013.01); *C08L 2203/10* (2013.01); *C08L 2205/025* (2013.01); *C08L 2207/066* (2013.01)

(58) Field of Classification Search
CPC ............... C08L 23/06; C08L 2203/10; C08L 2205/025; C08L 2207/066
See application file for complete search history.

(56) References Cited

U.S. PATENT DOCUMENTS

| | | | |
|---|---|---|---|
| 6,521,734 B1 * | 2/2003 | Araki | ..................... B32B 27/32 526/227 |
| 2004/0241477 A1 * | 12/2004 | Watanabe | ............ A61B 19/026 428/515 |
| 2010/0092621 A1 | 4/2010 | Akutsu et al. | |

FOREIGN PATENT DOCUMENTS

| | | |
|---|---|---|
| CN | 101133116 A | 2/2008 |
| JP | 9-087443 | 3/1997 |
| JP | 10-168245 | 6/1998 |
| JP | 10-168430 | 6/1998 |
| JP | 11-035745 | 2/1999 |
| JP | 2000-010243 | 1/2000 |
| JP | 2003-145694 | 5/2003 |
| JP | 2003-201377 | 7/2003 |
| JP | 2003-342427 | 12/2003 |
| JP | 2005-097485 | 4/2005 |
| JP | 2008-222291 | 9/2008 |
| JP | 2009-214914 | 9/2009 |
| JP | 2009-249404 | 10/2009 |
| JP | 2010-189052 | 9/2010 |
| WO | 2005/047387 | 5/2005 |
| WO | 2006/096504 A1 | 9/2006 |
| WO | 2010/029968 A1 | 3/2010 |

OTHER PUBLICATIONS

Chinese Office Action mailed May 27, 2015 in corresponding to Chinese Patent Application No. 2012800053677.0.
Exteneded European Search Report for European Patent Application No. 12846217.3, dated Jul. 13, 2015.
International Search Report issued Nov. 27, 2012 in PCT/JP2012/078167.
Japanese Office Action issued in Patent Application No. 2012-239382, dated Jun. 28, 2016.

\* cited by examiner

*Primary Examiner* — Robert Jones, Jr.
(74) *Attorney, Agent, or Firm* — Greenblum & Bernstein, P.L.C.

(57) ABSTRACT

A polyethylene resin composition which permits the bleeding additive contained therein to be bled at an increased rate even if it has a large molecular weight and, therefore, permits the bleeding agent to be bled to the surface of the resin in an amount sufficient for exhibiting its properties.

The polyethylene resin composition comprises, as a main polymer (A), a high pressure process low-density polyethylene and, as a sub-polymer (B), at least one kind of polyethylene selected from the group consisting of a metallocene-type low-density polyethylene and a high pressure process low-density polyethylene having an MFR larger than that of the main polymer (A), the polyethylene resin composition being, further, blended with a bleeding additive.

2 Claims, 1 Drawing Sheet

POLYETHYLENE RESIN COMPOSITION AND CONTAINERS USING THE SAME

TECHNICAL FIELD

This invention relates to a polyethylene resin composition. More specifically, the invention relates to a polyethylene resin composition containing a bleeding additive such as lubricant and to containers having the inner surface or the outer surface formed by using the same resin composition.

BACKGROUND ART

Plastic containers have been widely used for a variety of applications since they can be easily formed and inexpensively. Specifically, a low-density polyethylene is lowly crystalline, soft and flexible. The containers formed by using the low-density polyethylene enable the contents to be easily squeezed out and, therefore, have been widely used for containing paste-like contents such as ketchup, mayonnaise, paste, honey, shampoo and the like.

Here, the polyethylene containers are often blended with bleeding additives such as lubricant and the like to improve discharge property of the contents and to prevent the containers from adhering to each other or from adhering to a conveyer belt or the like. Similarly, polyethylene films such as films for agricultural use, garbage bags, shrinkable films and the like films, too, are often blended with bleeding additives such as anti-blocking agent and the like to prevent the films from adhering to each other.

For instance, patent documents 1 to 4 are disclosing polyethylene containers of the multi-layer structure containing a lubricant in the inner layer or the outer layer thereof of polyethylene, and liners blended with lubricants.

There has, further, been known an art of forming extrusion-laminated containers by using a polyethylene resin composition blended with a plurality of kinds of polyethylenes. For example, a patent document 5 discloses a polyethylene resin composition which contains two or more kinds of polyethylenes and a linear low-density polyethylene as a chief component.

PRIOR ART DOCUMENTS

Patent Documents

Patent document 1: JP-A-2008-222291
Patent document 2: JP-A-2009-214914
Patent document 3: JP-A-2009-249404
Patent document 4: JP-A-2010-189052
Patent document 5: JP-A-10-168245

OUTLINE OF THE INVENTION

Problems that the Invention is to Solve

The bleeding additives such as lubricant and the like exhibit their properties upon being bled in the surface of the resin, but are accompanied by a problem in that considerable periods of time are needed until they exhibit their properties to a sufficient degree. Depending on their kinds, for example, nearly one month is required until they are bled to the surface to exhibit properties to a sufficient degree. In particular, this tendency becomes conspicuous with an increase in the molecular weights.

Past studies about the bleeding additives such as lubricants were almost all directed to what kind of the lubricant could form a stable bleeding layer in the surface as proposed, for example, by the patent documents 1 to 4, and almost no study had dealt with the rate of bleeding. For instance, the art proposed in the patent document 5 is concerned to improving properties such as heat-sealing property by using a blend of a plural kinds of low-density polyethylenes without, however, giving any attention to the bleeding property of the additives.

It is, therefore, an object of the present invention to provide a polyethylene resin composition which permits the bleeding additive contained therein to be bled at an increased rate even if it has a large molecular weight and, therefore, permits the bleeding agent to be bled to the surface of the resin in an amount sufficient for exhibiting its properties.

Another object of the present invention is to provide packing containers obtained by using the above polyethylene resin composition.

Means for Solving the Problems

The present inventors have studied about the bleeding rates of the additives of when a polyethylene was blended with bleeding additives such as lubricants. As a result, the inventors have discovered that a resin composition comprising a polyethylene (high pressure process low-density polyethylene) having basic properties such as formability blended with a low-density polyethylene having different properties, permits the bleeding additives to be bled at very increased rates, and have completed the present invention.

According to the present invention, there is provided a polyethylene resin composition comprising, as a main polymer (A), a high pressure process low-density polyethylene and, as a sub-polymer (B), at least one kind of polyethylene selected from the group consisting of a metallocene-type low-density polyethylene and a high pressure process low-density polyethylene having an MFR larger than that of the main polymer (A), the polyethylene resin composition being, further, blended with a bleeding additive.

According to the present invention, further, there is provided a container having an inner surface or an outer surface formed by using the above polyethylene resin composition.

In the present invention, it is desired that:
(1) The main polymer (A) is a high pressure process low-density polyethylene having an MFR (190° C.) of not less than 0.1 g/10 min. but less than 5.0 g/10 min., the main polymer being contained in an amount of not less than 55% by weight;
(2) The sub-polymer (B) is a high pressure process low-density polyethylene (B1) having an MFR (190° C.) of 5 to 100 g/10 min. and/or a metallocene-type low-density polyethylene (B2), the sub-polymer being contained in an amount of not less than 2% by weight but less than 45% by weight;
(3) The high pressure process low-density polyethylene (B1) is contained in an amount of 0.5 to 10% by weight, and the metallocene-type low-density polyethylene (B2) is contained in an amount of not more than 44.5% by weight;
(4) The metallocene-type low-density polyethylene (B2) has a density smaller than that of the main polymer (A); and
(5) The bleeding additive is a fatty acid amide having a molecular weight of not less than 400.

Effects of the Invention

The polyethylene resin composition of the present invention blended with the bleeding additive has a feature in that use is made of a sub-polymer (B) for adjusting the bleeding property in addition to using the main polymer (A) that is the main component, as polyethylene that serves as a matrix and, specifically, has a distinguished feature in that the polyethylene that is the main polymer (A) is a low-density polyethylene produced by the high pressure process while the sub-polymer that is used is a metallocene-type low-density polyethylene (B2) or a high pressure process low-density polyethylene (B1) having an MFR larger than that of the low-density polyethylene that is the main polymer (A).

Upon using the main polymer (A) and the sub-polymer (B) that comprise the above low-density polyethylenes in combination, it is allowed to greatly improve the bleeding property without impairing the formability. Besides, the bleeding additive added to the resin composition bleeds in the surface of the resin in very short periods of time to exhibit its property to a sufficient degree.

For example, among the Examples appearing later, the Comparative Example deals with a polyethylene container having an inner layer formed by using a resin composition comprising only the high pressure process low-density polyethylene which is the main polymer (A) and which is blended with a predetermined amount of a lubricant (ethylenebisoleic acid amide, molecular weight of 589), and measures the time until the lubricant bleeds in the inner surface (surface of the inner layer) of the container to exhibit sufficient degree of property. In this case, 55 days was required until the property was exhibited after the container has been formed.

Examples 1 to 3, on the other hand, use the high pressure process low-density polyethylene which is the main polymer (A) as well as the high pressure process low-density polyethylene (B1) which is the sub-polymer (B) and having an MFR larger than that of the main polymer (A). Namely, Examples 1 to 3 deal with polyethylene containers having an inner layer formed by using the resin compositions in which the polyethylenes are blended with the lubricant in the same amount as in Comparative Example, and take the same measurement as above. In these cases, the property of the lubricant is exhibited to a sufficient degree in only 3 to 4 days.

Further, Example 5 uses, as the sub-polymer (B), the above high pressure process low-density polyethylene (B1) having a large MFR and the metallocene-type low-density polyethylene (B2) in combination in addition to using the main polymer (A). Namely, Example 5 deals with a polyethylene container having an inner layer formed by using the resin composition in which the polyethylenes are blended with the lubricant in the same amount as in Comparative Example, and takes the same measurement as above. In this case, the time until property of the lubricant is fully exhibited is, further, shortened to only one day.

According to the present invention as described above, the low-density polyethylene having predetermined properties is also used as the sub-polymer (B) in addition to using the high pressure process low-density polyethylene which is the main polymer (A) enabling the bleeding additive added to the resin composition to be bled at a very increased rate.

Since the main polymer (A) that is used features flexibility and excellent formability, the polyethylene resin composition of the present invention can be favorably used for producing trays, cups and bottle-shaped containers and, specifically, for producing direct-blow-formed containers.

Besides, the polyethylene resin composition features a high bleeding rate enabling the bleeding additive contained therein to exhibit its property readily after the forming. As a matter of course, therefore, the polyethylene resin composition permits the bleeding additive to effectively exhibit its function when it is used for forming the layers on the inner and outer surfaces of various plastic base materials or is used for forming layers neighboring the inner surfaces or the outer surfaces. Not being limited to the plastic base materials only, the polyethylene resin composition can also be used as a coating formed on the surfaces of papers, glasses and metals.

MODES FOR CARRYING OUT THE INVENTION

Figure 1:
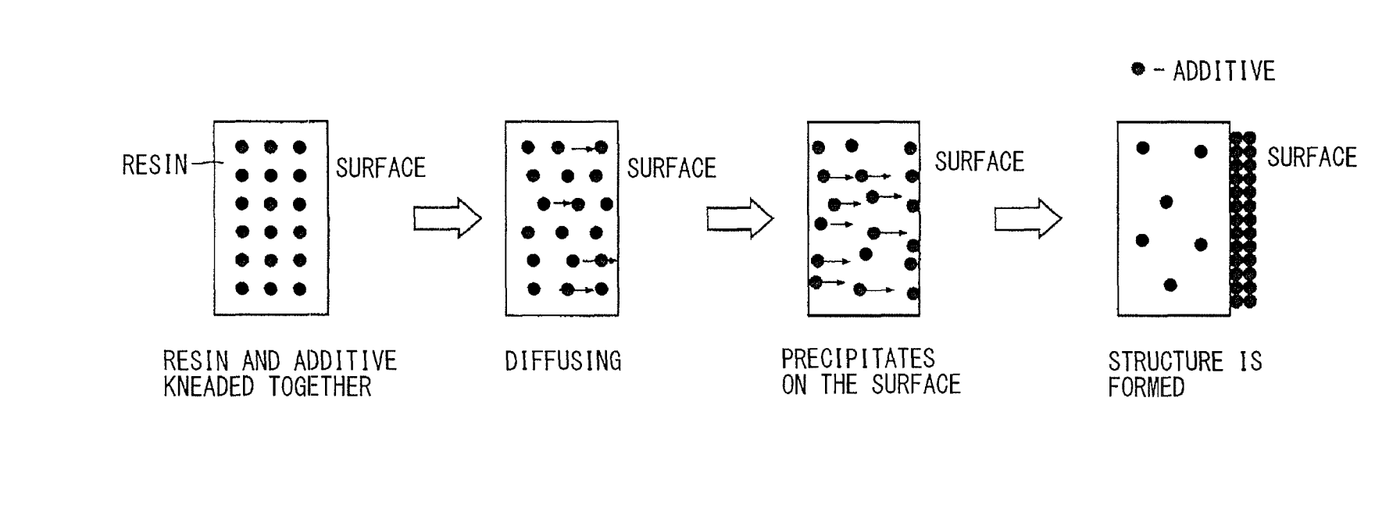
[FIG. 1] is a drawing illustrating the bleeding phenomenon.

Referring to FIG. 1 which illustrates the bleeding phenomenon, a bleeding additive that is homogeneously dispersed in a resin migrates (diffuses) toward the surface side of the resin, gradually precipitates on the surface, and finally precipitates on all over the surface of the resin (forms a multi-layer structure depending on the kind of the additive) to exhibit its properties (e.g., improved slipping property, preventing stickiness and anti-blocking).

That is, the bleeding additive migrates toward the surface passing through spaces in the amorphous portions of the entangled polymer chains. Therefore, the rate of migration (rate of bleeding) decreases with an increase in the molecular weight of the additive. Further, in order for the additive to migrate onto the surface, very small spaces must have been formed in the entangled polymer chains to permit the migration of the additive. Very small spaces are formed in the amorphous portions in the matrix polymer. To form very small spaces, it becomes necessary to loosen the polymer chains (relax the polymer chains) and to migrate the polymer chains. It is considered that easiness for relaxing the polymer chains is determined by the molecular weight of the polymer, polymer architecture (linear, branched, star-like, etc.) and crystallinity.

In the invention, the frequency for loosening the entanglement of polymer chains forming the matrix increases owing to the use of a plurality of matrix-forming polymers in combination, and very small spaces are easily formed permitting the additive to migrate through. As a result, the rate of bleeding was successfully improved.

<Main Polymer (A)>

The resin composition of the present invention uses the main polymer (A) in the largest amount, and exhibits its basic properties. The main polymer (A) is contained in the resin composition in an amount of, usually, not less than 55% by weight and, specifically, in an amount of 55 to 80% by weight.

The invention uses a high pressure process low-density polyethylene as the main polymer (A).

The high pressure process low-density polyethylene is a polyethylene that is obtained using no catalyst or using a peroxide as a polymerization catalyst, and has a density in a range of not less than 0.910 g/cm$^3$ but less than 0.930 g/cm$^3$. The high pressure process low-density polyethylene is different from the metallocene-type low-density polyethylene that will be described later in regard to that it has many branched chains attached to the linear molecules. Therefore, its crystallinity is low, its molecular arrangement is irregular and, as a result, the bleeding additive can easily migrate therethrough (through the amorphous portions). Namely, by using the high pressure process low-density polyethylene as the main polymer (A), it is allowed to improve the bleeding rate of the bleeding additive.

However, the high pressure low-density polyethylene has branched or star-like portions in the polymer thereof and, therefore, permits the polymer chains to be relaxed more slowly than the sub-polymer (B) that will be described later, allowing the bleeding additive to be bled at a decreased rate.

Further, the high pressure process low-density polyethylene is soft, has a broad molecular weight distribution, causing little draw-down, and is very suited for being formed. Namely, by using the high pressure process low-density polyethylene as the main polymer (A) in the largest amount, the resin composition of the present invention can be effectively used for forming direct-blow-formed containers yet imparting flexibility or squeezing property to the containers.

There is no particular limitation on the MFR (190° C.) of the high pressure process low-density polyethylene so far as it maintains the formability. From the standpoint of not deteriorating the formability by the use of the sub-polymer (B) that will be described later in combination, however, it is desired that the high pressure process low-density polyethylene has the MFR (190° C.) in a range of not less than 0.1 g/10 min. but less than 5.0 g/10 min. and, specifically, from 0.1 to 3.0 g/10 min.

In the following description, the MFR is a value measured at 190° C. unless stated otherwise.

<Sub-Polymer (B)>

The invention, further, uses, as the sub-polymer (B), a high pressure process low-density polythylene (B1) having an MFR larger than that of the main polymer (A) or a metallocene-type low-density polyethylene (B2) in combination with the main polymer (A). Use of the sub-polymer (B) helps the bleeding additive to migrate more easily and further improves the bleeding rate.

For example, the high pressure process low-density polyethylene (B1) having the MFR larger than that of the main polymer (A), has a molecular weight smaller than that of the main polymer (A) and has short molecular chains. Namely, these portions have molecular weights smaller than that of the main polymer (A) enabling the polymer chains to be relaxed. At the same time, upon using the low-density polyethylene (B1) and the main polymer (A) in combination, the main polymer (A) which by itself is not easily relaxed gets tangled with the low-density polyethylene (B1). As a result, the main polymer (A) is easily relaxed to form very small spaces through which the bleeding additive migrates presumably accounting for an improved bleeding rate.

The metallocene-type low-density polyethylene (B2) is obtained by copolymerizing an ethylene with a small amount of other α-olefin by using a metallocene catalyst. For example, the α-olefin such as 1-butene, 1-hexane or 4-methylpentene-1 is copolymerized in an amount of about several percent with an ethylene to introduce short-chain branches into a long chain so as to decrease the density. Therefore, the metallocene-type low-density polyethylene (B2) has a decreased number of short-chain branches and features a high degree of molecular linearity as compared to the above-mentioned high pressure process low-density polyethylene. Further, being copolymerized with a small amount of α-olefin, the crystallinity is low, and the density is, usually, in a range of 0.880 to 0.910 g/cm$^3$.

That is, the metallocene-type low-density polyethylene (B2) is a copolymer of the ethylene and the α-olefin, and has almost no long-chain branch and is highly linear as compared to the main polymer (A). Because of its highly linear property as compared to the main polymer (A), the metallocene-type low-density polyethylene (B2) permits the polymer chains to be easily relaxed from the tangled state (i.e., tangled polymer chains can be easily loosened). Upon using the metallocene-type low-density polyethylene (B2) and the main polymer (A) in combination, therefore, the metallocene-type low-density polyethylene (B2) and the main polymer (A) are tangled with each other. As a result, the main polymer (A) tends to be relaxed by the action of the metallocene-type low-density polyethylene (B2) used in combination, very small spaces are easily formed permitting the bleeding additive to migrate and, therefore, the bleeding rate is presumably improved.

In the present invention, the bleeding additive bleeds onto the surface migrating through the amorphous portions of the matrix polymer (migrating through the portions where the polymer chains are tangled together). It is, therefore, desired that the metallocene-type low-density polyethylene (B2) is copolymerized with the α-olefin in relatively large amounts, is lowly crystalline containing much amorphous portions, and has a lower density or is desirably a lowly crystalline polyethylene having a density in a range of 0.880 to 0.905 g/cm$^3$.

Here, the above sub-polymers (B) are all superior to the main polymer (A) in regard to improving the bleeding rate. However, use of the sub-polymers (B) in large amounts may bring about inconvenience such as a decrease in the formability.

For example, the high pressure process low-density polyethylene (B1) has an MFR larger than that of the main polymer (A) and a molecular weight smaller than that of the main polymer (A). If the polyethylene (B1) is used in large amounts, therefore, there easily occurs the draw-down causing a decrease in the formability and a decrease in the mechanical properties such as mechanical strength and heat resistance. It is, of course, allowable to use the polyethylene (B1) having an MFR which is little different from that of the main polymer (A) exhibiting, however, a decreased effect for improving the bleeding rate.

The metallocene-type low-density polyethylene (B2) has a molecular weight distribution narrower than that of the main polymer (A) causing a decrease in the die swell and the occurrence of draw-down at the time of forming. Therefore, use of the metallocene-type low-density polyethylene (B2) in large amounts causes a great decrease in the formability and may make it difficult to form the containers by, for example, direct-blow forming.

In the present invention, therefore, the polyethylenes (B1) and (B2) are used as sub-polymers (B) in amounts in a range in which the main polymer (A) is used in amounts as described above. For instance, it is desired that the sub-polymers (B) are contained in the polyethylene resin composition in amounts in a range of not less than 2% by weight but less than 45% by weight.

In the invention, further, it is desired to use the above two kinds of sub-polymers in combination. For example, it is desired to use the high pressure process low-density polyethylene (B1) having a large MFR and the metallocene-type low-density polyethylene (B2) in combination. As for the amounts of the high pressure process low-density polyethylene (B1) and the metallocene-type low-density polyethylene (B2) that are used, it is desired that (B1) is used in an amount of not more than 10% by weight and (B2) is used in an amount of less than 45% by weight as sub-polymers (B) per 100% by weight of the total of the main polymer (A), sub-polymer (B) and the bleeding additive that are forming the resin composition though the ratio may vary depending on the ratio of the main polymer (A) and the sub-polymer (B). More desirably, the high pressure process low-density polyethylene (B1) is used in an amount of 0.5 to 10% by weight, and the metallocene-type low-density polyethylene (B2) is used in an amount of not more than 44.5% by weight. Upon using the above two in combination, relaxation takes place more easily among the three components, i.e., relaxation phenomenon is promoted between the high pressure process low-density polyethylene (B1) having short molecular chains and the main polymer (A), relaxation phenomenon is promoted between the metallocene-type low-density polyethylene (B2) and the main polymer (A), and relaxation phenomenon is promoted between the high pressure process low-density polyethylene (B1) having short molecular chains and the metallocene-type low-density polyethylene (B2), making it possible to greatly improve the bleeding rate.

<Bleeding Additive>

As the bleeding additive, the present invention uses a compound that is not miscible with the resin but that bleeds onto the surface of the resin to exhibit desired properties such as slipping property and anti-blocking property.

Described below are concrete examples of the bleeding additive though it is not limited thereto only.

(a) Those of the hydrocarbon type, such as fluid, natural or synthetic paraffin, micro wax, polyethylene wax, chlorinated polyethylene wax and the like;
(b) Those of the fatty acid type, such as stearic acid, lauric acid and the like;
(c) Those of the type of aliphatic amide, such as stearic acid amide, palmitic acid amide, oleic acid amide, erucic acid amide, methylenebisstearic acid amide, ethylenebisstearic acid amide, ethylenebisbehenic acid amide, ethylenebisoleic acid amide and the like;
(d) Those of the type of ester of fatty acid, such as butyl stearate, cured castor oil, ethylene glycol monostearate and the like;
(e) Those of the alcohol type, such as cetyl alcohol, stearyl alcohol and the like;
(f) Metal soaps such as zinc stearate, calcium stearate and the like;
(g) Polyorganosiloxane; and
(h) Those of the type of ester of glycerin fatty acid, such as intermediate chain fatty acid triglyceride, glycerin diacetomonooleate, glycerin trioleate, decaglycerin oleate and the like.

In the present invention, the above bleeding additives have been known chiefly as lubricants. Among them, those having molecular weights of not less than 400 are preferred. Namely, the compounds having large molecular weights basically have small bleeding rates. The present invention, however, makes it possible to greatly increase the bleeding rates of even those bleeding additives having such large molecular weights.

Among the above bleeding additives, preferred are amphipatic compounds such as aliphatic amides. This is because the amphipatic compounds form a multi-layer structure when they are bled onto the surface of the resin to exhibit their properties to a sufficient degree.

In the present invention, therefore, what is most preferred is a fatty acid amide having a molecular weight of not less than 400, such as ethylenebisoleic acid amide.

Further, the bleeding additive is added to the polyethylene resin composition in an amount of at least not less than 0.05% by weight and, preferably, not less than 0.1% by weight though it may vary depending on the kind thereof or the required properties.

This is because if the concentration of the bleeding additive in the resin composition is too low, the rate of migration onto the surface greatly decreases, too, which is not advantageous for improving the bleeding rate.

As described above, the polyethylene resin composition of the present invention is formed by adding the bleeding additive to the above-mentioned main polymer (A) and the sub-polymer (B), and mixing them together by melt-kneading or the like. Depending on the use, however, the polyethylene resin composition may be, further, blended with ultraviolet-ray absorber, pigment, dye and various fillers in suitable amounts.

<Use>

In addition to such an advantage that the properties of the bleeding additive can be quickly exhibited after the forming, the polyethylene resin composition of the present invention has properties specific to the low-density polyethylene, such as flexibility and formability, and can, therefore, be very favorably used as a material of the containers formed by the so-called direct-blow forming. The containers have flexibility or squeezing property. When filled with viscous paste-like contents such as ketchup, sauce, paste, mayonnaise, etc., therefore, the container permits such contents to be easily taken out.

It is desired that the containers are, usually, formed in a multi-layer structure. By using the polyethylene resin composition to format least either the inner layer or the outer layer, therefore, the inner layer or the outer layer can exhibit properties of the bleeding additive.

It is, further, desired to form a gas-barrier resin layer as an intermediate layer between the inner layer and the outer layer via adhesive layers. This improves oxygen-barrier property of the containers, and the contents can be prevented from being oxidized and deteriorated for extended periods of time.

1. Inner and Outer Layers:

If the inner layer of the container is formed by using the polyethylene resin composition, the bleeding additive exhibits improved slipping property for the content in the container permitting the content to be more easily discharged (squeezed out). For instance, if the container is held upside down, the content in the container quickly falls down onto the mouth side and can be quickly discharged through the mouth.

If the polyethylene resin composition is used for forming the outer layer, further, the containers can be prevented from sticking to each other or the containers can be prevented from sticking to the conveyer belt in the step of conveying the containers, improving conveyance of the containers.

That is, if the polyethylene composition of the invention is used for forming either the inner layer or the outer layer, the above properties of the bleeding additive can be readily exhibited after the container is formed.

If the inner layer or the outer layer is to be formed by using a resin other than the above polyethylene composition, it is desired to use the above-mentioned high pressure process low-density polyethylene from the standpoint of container properties such as formability and flexibility.

Further, the inner layer or the outer layer formed by using the polyethylene resin composition of the invention or the inner layer or the outer layer formed by using simply the low-density polyethylene, may have a thickness that is so selected as to maintain basic properties of the container to meet the use and that does not unnecessarily increase the whole thickness of the container.

2. Gas-Barrier Resin Layer:

The above container can be, further, provided with a gas-barrier resin layer (hereinafter often referred to simply as "gas-barrier layer") as an intermediate layer between the inner layer and the outer layer to effectively suppress oxidation or deterioration of the content caused by oxygen that permeates through.

As the gas-barrier resin for forming the above layer, there can be representatively used an ethylene-vinyl alcohol copolymer (saponified product of an ethylene-vinyl acetate copolymer) and an aromatic polyamide and, specifically, an ethylene-vinyl alcohol copolymer from the standpoint of its high oxygen-blocking property.

As the ethylene-vinyl alcohol copolymer, usually, there are preferably used saponified products of a copolymer obtained by so saponifying the ethylene-vinyl acetate copolymer having an ethylene content of 20 to 60 mol % and, specifically, 25 to 50 mol % that the degree of saponification is not less than 96 mol % and, specifically, not less than 99 mol %. Among them, most desired as the gas-barrier resin is an ethylene-vinyl alcohol copolymer having a suitable degree of formability (MFR), e.g., having an MFR nearly the same as that of the low-density polyethylene (LDPE) forming the inner and outer layers.

The thickness of the gas-barrier layer is so set as to exhibit excellent oxygen-blocking property and is, usually, set to lie, for example, in a range of about 5 to about 50 µm.

It is also allowable to impart oxygen-absorbing property to the above gas-barrier resin layer to improve its gas-barrier property (oxygen-blocking property).

To impart the oxygen-absorbing property, the above gas-barrier resin layer may be blended with an oxidizable polymer. As required, further, a transition metal catalyst (oxidizing catalyst) may be added thereto to further improve the oxygen-absorbing property. Namely, upon oxidizing the oxidizable polymer, the oxygen is absorbed and trapped to enhance the gas-barrier function of the gas-barrier resin. The transition metal catalyst is suitably added in order to accelerate the oxidation of the oxidizable polymer.

The above oxygen-absorbing gas-barrier resin layer has been known per se, and JP-A-2003-266619 is disclosing oxidizable polymers and transition catalysts.

As the oxidizable polymer, for instance, there has been used an ethylenically unsaturated group-containing polymer. Namely, this polymer has carbon-carbon double bond; i.e., the double bonded portions are easily oxidized with oxygen to thereby absorb and trap oxygen. Examples of the ethylenically unsaturated group-containing polymer include homopolymers or copolymers having an oxidizable constituent unit stemming from the conjugated dienes such as butadiene and the like; chain-like non-conjugated dienes such as 1,4-hexadiene and the like; and cyclic non-conjugated dienes such as methyltetrahydroindene and the like. Into these polymers may be introduced a functional group such as carboxylic acid group or carboxylic anhydride group to improve dispersion property. The oxidizable polymer can be added in an amount of about 1 to about 15 parts by weight per 100 parts by weight of the gas-barrier resin.

Referring to the transition metal catalyst that is suitably used, examples of the transition metal include metals of the Group VIII of periodic table, such as iron, cobalt and nickel; metals of the Group I, such as copper and silver; metals of the Group IV, such as tin, titanium and zirconium; metals of the Group V, such as vanadium; metals of the Group VI, such as chromium; and metals of the Group VII, such as manganese. Among them, cobalt is specifically desired since it can very greatly promote the oxygen-absorbing property (oxidation of the oxidizable polymer). The catalysts of such transition metals are, usually, in the form of inorganic salts (e.g., halides), organic salts (e.g., carboxylates) or complexes (e.g., complexes with β-diketone or β-keto-acid ester). Such transition metal catalysts can be added in an amount of, for example, 10 to 1000 ppm calculated as the amount of metal per 100 parts by weight of the gas-barrier resin.

3. Adhesive Layer:

The adhesive layer is formed by using an acid-modified polyolefin, and works as an adhesive for firmly adhering the inner and outer layers of various kinds of low-density polyethylenes to the gas-barrier layer of the gas-barrier resin.

Usually, the adhesive layer is the one formed by graft-modifying a polyolefin such as polyethylene with a carboxylic acid such as maleic acid, itaconic acid or fumaric acid or an anhydride thereof, amido and ester, and is, preferably, formed by using a polyethylene that is graft-modified with a maleic acid or a maleic anhydride.

From the standpoint of formability, further, there is preferably used an acid-modified polyethylene having an MFR (190° C.) of about 0.2 to about 30 g/10 min.

In the invention, the adhesive layer should be used in a thickness that maintains favorable adhesiveness and that does not cause the thickness of the container to become unnecessarily large. Usually, the adhesive layer may have a thickness of 1 to 50 µm and, specifically, about 2 to about 20 µm.

4. Other Layers:

Further, with the container of the multi-layer structure using the polyethylene resin composition of the invention for forming at least either the inner layer or the outer layer, it is allowed to use, for example, the regrind (scrap resin) that generates when the container is formed being mixed with the virgin low-density polyethylene (usually, a high pressure process low-density polyethylene) in amounts in a range in which it does not impair the properties of the container. In this case, it is desired that the amount of the regrind is about 10 to about 60 parts by weight per 100 parts by weight of the virgin low-density polyethylene from the standpoint of reusing the resources yet maintaining formability.

The regrind layer may be positioned neighboring the inner layer or the outer layer so will not to adversely affect the container properties and may have such a thickness that does not cause the thickness of the container to be unnecessarily large.

The container having the above multi-layer structure is produced typically in the form of a bottle by co-extruding the resin compositions for forming the layers, and melt-extruding the resins into the tube-like parison followed by the direct-blow forming by using, for example, a two-split metal mold. It is, of course, also allowable to form a preform of the shape of a flat plate having a predetermined layer structure by the extrusion forming or the injection forming, and subjecting the preform to the vacuum forming, pressure forming or plug-assist forming to obtain a container in the form of a tray or cup.

The above container of the multi-layer structure is suited for containing, specifically, viscous and paste-like contents, such as ketchup, aqueous paste, honey, sauces and shampoo, and is, particularly, useful as a bottle which squeezes out the content.

Further, the polyethylene resin composition of the present invention can be used for forming not only the direct-blow-formed containers but also for forming bag-like containers by, for example, co-extruding the molten resins or by applying the molten resins onto the surface of a base material to form a multi-layer film, and forming the bag-like containers in a manner that the polyethylene resin composition of the invention is positioned on the inner surface side.

Further, the polyethylene resin composition can be applied not only onto the plastic base material but also onto the surfaces of the paper, glass or metal so that properties of the bleeding additive contained in the composition can be exhibited. Specifically, the polyethylene resin composition can be applied onto the surface of a paper sheet which is then assembled into a box with the coating on the inner surface, and a desired fitting for pouring is attached to fabricate a paper packing container. Or the paper sheet coated with the polyethylene resin composition is fabricated into a cup with the coating on the inner surface side to use it as a paper cup. In either case, properties of the bleeding additive can be exhibited to a sufficient degree.

EXAMPLES

The invention will now be described by way of the following Examples.

Described below are various evaluations or measurements conducted in Examples, as well as resins and bleeding additive components used therein.

1. Content Slip-Down Test.

A sealing foil was removed from a sample bottle filled with about 500 g of a content (tomato ketchup), and 400 g of the content was taken out at room temperature. Thereafter, a cap was fitted thereto, the bottle was allowed to stand upright and was left to stand at room temperature for 10 minutes.

Next, the bottle was turned upside down at 25° C. to observe the behavior of the content that was moving from the bottom side of the bottle toward the cap side. The slip-down property of the content was evaluated to be good when it has all moved down to the cap side after the bottle was erected upside down for 5 minutes, and to be poor when it has not all moved down.

Evaluating the periods until the slip-down property is exhibited.

The bottles formed by the method described later were stored in an environment of 22° C. 60% RH. The bottles stored for a predetermined period of time were filled with the tomato ketchup heated at a temperature of 85° C., were cooled in a water vessel with their mouth portions being sealed, and were stored in an environment of 22° C. 60% RH for one week. After stored, the above content slip-down test was conducted. The periods until good slip-down property was exhibited, were evaluated with the period of storage from the day of forming as a variable.

3. Differential Scanning Calorimetry.

The main polymer (A) and the sub-polymer (B) to be used (each about 7 mg) were measured by using a differential scanning calorimeter (Diamond DSC manufactured by PERKIN ELMER Co.).

The samples were scanned from 25° C. through up to 200° C. at a heating-up rate of 10° C./min., maintained at 200° C. for 3 minutes, scanned from 200° C. through down to −50° C. at a cooling-down rate of 10° C./min., and were maintained at −50° C. for 3 minutes. Thereafter, the samples were scanned from −50° C. through up to 200° C. at a heating-up rate of 10° C./min. to obtain a profile and from which were found the melting points (peak melting temperatures) of the polymers and the heat of fusion ($\Delta H$) thereof. Crystallinities of the polymers were calculated by dividing the heat of fusion ($\Delta H$) obtained from the measurement of the polymers by the heat of fusion ($\Delta H$)=293 J/g of perfect crystals of the polyethylene.

4. Measuring the Ratio of the Inner Layer of the Bottle.

The layer constitution of the body wall in cross section of the multi-layer bottle formed by the method described later was observed at a position 50 mm above the bottom of the bottle by using a polarizing microscope to find the layer constitution of the body wall of the bottle. The layer constitution was observed at positions of 0°, 90°, 180° and 270° relative to the cross section, and an average value thereof in four directions was regarded to be the layer constitution of the bottle.

<Main Polymer (A)>

A high pressure process low-density polyethylene (MFR=0.3) was used as the main polymer (A). The MFR, melting point and crystallinity of the polymer that was used were as shown in Table 1.

<Sub-Polymer (B)>

Three kinds of high pressure process low-density polyethylenes (B1) and one kind of metallocene-type low-density polyethylene (B2) were used as the sub-polymer (B). The MFRs, melting points and crystallinities of the polymers that were used were as shown in Table 1.

<Bleeding Additive>

An ethylenebisoleic acid amide (molecular weight=589) was used as the bleeding additive.

TABLE 1

| | | MFR g/10 min. | Melting point ° C. | Crystallinity |
|---|---|---|---|---|
| Main polymer (A) | | | | |
| (A) | High-pressure low-density polyethylene | 0.3 | 111 | 0.37 |
| Sub-polymer (B) | | | | |
| (B1a) | High-pressure low-density polyethylene | 7 | 105 | 0.36 |
| (B1b) | High-pressure low-density polyethylene | 20 | 103 | 0.34 |
| (B1c) | High-pressure low-density polyethylene | 50 | 103 | 0.33 |
| (B2) | Metallocene low-density polyethylene | 2.2 | 60 | 0.10 |

Example 1

As resins for forming the outermost layer and the innermost layer, there were fed, into a 40-mm extruder, a high pressure process low-density polyethylene (MFR=0.3) as the main polymer (A), a high pressure low-density polyethylene (B1a) (MFR=7) as the sub-polymer (B), and an ethylenebisoleic acid amide as the bleeding additive at a ratio of (A)/(B1a)/bleeding additive=95/4.5/0.5 (% by weight). As the resin for forming the second inner layer, a high pressure process low-density polyethylene (MFR=0.3) was fed into a 50-mm extruder. As the resin for forming the adhesive layer, a maleic anhydride-modified polyethylene was fed into a 30-mm extruder A and as the resin for forming the gas-barrier layer, pelletized resin of an ethylene-vinyl alcohol copolymer was fed into a 30-mm extruder B. A molten parison was extruded through a multi-layer die head heated at a temperature of 210° C., and from which a four-kind-six-layer bottle of a capacity of 500 g weighing 20 g was produced by the known direct-blow-forming method. The period until the slip-down property was exhibited was evaluated to be as shown in Table 2.

The layer constitution of the body wall of the bottle was as follows:
Outermost layer: 30 μm
Adhesive layer: 10 μm
Gas-barrier layer: 25 μm
Adhesive layer: 10 μm
Second inner layer: 225 μm
Innermost layer: 100 μm (ratio of the innermost layer, 25%)

Example 2

A multi-layer bottle was produced in the same manner as in Example 1 but feeding, into the 40-mm extruder and as resins for forming the outermost layer and the innermost layer, the high pressure process low-density polyethylene (MFR=0.3) as the main polymer (A), a high pressure low-density polyethylene (B1b) (MFR=20) as the sub-polymer (B), and the ethylenebisoleic acid amide as the bleeding additive at a ratio of (A)/(B1b)/bleeding additive=95/4.5/0.5 (% by weight). The body wall of the bottle possessed a ratio of the innermost layer of 25%. The period until the slip-down property was exhibited was evaluated to be as shown in Table 2.

Example 3

A multi-layer bottle was produced in the same manner as in Example 1 but feeding, into the 40-mm extruder and as resins for forming the outermost layer and the innermost layer, the high pressure process low-density polyethylene (MFR=0.3) as the main polymer (A), a high pressure low-density polyethylene (B1c) (MFR=50) as the sub-polymer (B), and the ethylenebisoleic acid amide as the bleeding additive at a ratio of (A)/(B1c)/bleeding additive=95/4.5/0.5 (% by weight). The body wall of the bottle possessed a ratio of the innermost layer of 25%. The period until the slip-down property was exhibited was evaluated to be as shown in Table 2.

Example 4

A multi-layer bottle was produced in the same manner as in Example 1 but feeding, into the 40-mm extruder and as resins for forming the outermost layer and the innermost layer, the high pressure process low-density polyethylene (MFR=0.3) as the main polymer (A), a high pressure low-density polyethylene (B1a) (MFR=7) and a metallocene-type low-density polyethylene (B2) (MFR=2.2) as the sub-polymer (B), and the ethylenebisoleic acid amide as the bleeding additive at a ratio of (A)/(B1a)/(B2)/bleeding additive=85/4.5/10/0.5 (% by weight). The body wall of the bottle possessed a ratio of the innermost layer of 25%. The period until the slip-down property was exhibited was evaluated to be as shown in Table 2.

Example 5

A multi-layer bottle was produced in the same manner as in Example 1 but feeding, into the 40-mm extruder and as resins for forming the outermost layer and the innermost layer, the high pressure process low-density polyethylene (MFR=0.3) as the main polymer (A), the high pressure low-density polyethylene (B1a) (MFR=7) and the metallocene-type low-density polyethylene (B2) (MFR=2.2) as the sub-polymer (B), and the ethylenebisoleic acid amide as the bleeding additive at a ratio of (A)/(B1a)/(B2)/bleeding additive=75/4.5/20/0.5 (% by weight). The body wall of the bottle possessed a ratio of the innermost layer of 25%. The period until the slip-down property was exhibited was evaluated to be as shown in Table 2.

Example 6

A multi-layer bottle was produced in the same manner as in Example 1 but feeding, into the 40-mm extruder and as resins for forming the outermost layer and the innermost layer, the high pressure process low-density polyethylene (MFR=0.3) as the main polymer (A), the high pressure low-density polyethylene (B1a) (MFR=7) and the metallocene-type low-density polyethylene (B2) (MFR=2.2) as the sub-polymer (B), and the ethylenebisoleic acid amide as the bleeding additive at a ratio of (A)/(B1a)/(B2)/bleeding additive=65/4.5/30/0.5 (% by weight). The body wall of the bottle possessed a ratio of the innermost layer of 25%. The period until the slip-down property was exhibited was evaluated to be as shown in Table 2.

Example 7

A multi-layer bottle was produced in the same manner as in Example 1 but feeding, into the 40-mm extruder and as resins for forming the outermost layer and the innermost layer, the high pressure process low-density polyethylene (MFR=0.3) as the main polymer (A), the high pressure low-density polyethylene (B1a) (MFR=7) and the metallocene-type low-density polyethylene (B2) (MFR=2.2) as the sub-polymer (B), and the ethylenebisoleic acid amide as the bleeding additive at a ratio of (A)/(B1a)/(B2)/bleeding additive=55/4.5/40/0.5 (% by weight). The body wall of the bottle possessed a ratio of the innermost layer of 25%. The period until the slip-down property was exhibited was evaluated to be as shown in Table 2.

Example 8

A multi-layer bottle was produced in the same manner as in Example 6 but feeding, into the 40-mm extruder and as resins for forming the outermost layer and the innermost layer, the high pressure process low-density polyethylene (MFR=0.3) as the main polymer (A), the high pressure low-density polyethylene (B1a) (MFR=7) and the metallocene-type low-density polyethylene (B2) (MFR=2.2) as the sub-polymer (B), and the ethylenebisoleic acid amide as the bleeding additive at a ratio of (A)/(B1a)/(B2)/bleeding additive=65/4.5/30/0.5 (% by weight), and changing the ratio of the layer constitution. The period until the slip-down property was exhibited was evaluated to be as shown in Table 2.

The layer constitution of the body wall of the bottle was as follows:
Outermost layer: 30 μm
Adhesive layer: 10 μm
Gas-barrier layer: 25 μm
Adhesive layer: 10 μm
Second inner layer: 250 μm
Innermost layer: 75 μm (ratio of the innermost layer, 19%)

Example 9

A multi-layer bottle was produced in the same manner as in Example 8 but feeding, into the 40-mm extruder and as resins for forming the outermost layer and the innermost layer, the high pressure process low-density polyethylene (MFR=0.3) as the main polymer (A), the high pressure low-density polyethylene (B1a) (MFR=7) and the metallocene-type low-density polyethylene (B2) (MFR=2.2) as the sub-polymer (B), and the ethylenebisoleic acid amide as the bleeding additive at a ratio of (A)/(B1a)/(B2)/bleeding additive=65/4.5/30/0.5 (% by weight) and, further, changing the ratio of the layer constitution. The period until the slip-down property was exhibited was evaluated to be as shown in Table 2.

The layer constitution of the body wall of the bottle was as follows:
Outermost layer: 30 μm
Adhesive layer: 10 μm
Gas-barrier layer: 25 μm
Adhesive layer: 10 μm
Second inner layer: 270 μm
Innermost layer: 55 μm (ratio of the innermost layer, 14%)

Example 10

A multi-layer bottle was produced in the same manner as in Example 9 but feeding, into the 40-mm extruder and as resins for forming the outermost layer and the innermost layer, the high pressure process low-density polyethylene (MFR=0.3) as the main polymer (A), the high pressure low-density polyethylene (B1a) (MFR=7) and the metallocene-type low-density polyethylene (B2) (MFR=2.2) as the sub-polymer (B), and the ethylenebisoleic acid amide as the bleeding additive at a ratio of (A)/(B1a)/(B2)/bleeding additive=67/2.7/30/0.3 (% by weight). The body wall of the bottle possessed a ratio of the innermost layer of 14%. The period until the slip-down property was exhibited was evaluated to be as shown in Table 2.

Example 11

A multi-layer bottle was produced in the same manner as in Example 9 but feeding, into the 40-mm extruder and as resins for forming the outermost layer and the innermost layer, the high pressure process low-density polyethylene (MFR=0.3) as the main polymer (A), the high pressure low-density polyethylene (B1a) (MFR=7) and the metallocene-type low-density polyethylene (B2) (MFR=2.2) as the sub-polymer (B), and the ethylenebisoleic acid amide as the bleeding additive at a ratio of (A)/(B1a)/(B2)/bleeding additive=69/0.9/30/0.1 (% by weight). The body wall of the bottle possessed a ratio of the innermost layer of 14%. The period until the slip-down property was exhibited was evaluated to be as shown in Table 2.

Comparative Example 1

A multi-layer bottle was produced in the same manner as in Example 1 but feeding, into the 40-mm extruder and as resins for forming the outermost layer and the innermost layer, the high pressure process low-density polyethylene (MFR=0.3) as the main polymer (A), and the ethylenebisoleic acid amide as the bleeding additive at a ratio of (A)/bleeding additive=99.5/0.5 (% by weight). The period until the slip-down property was exhibited was evaluated to be as shown in Table 2.

The layer constitution of the body wall of the bottle was as follows:
Outermost layer: 30 μm
Adhesive layer: 10 μm
Gas-barrier layer: 25 μm
Adhesive layer: 10 μm
Second inner layer: 225 μm
Innermost layer: 100 μm (ratio of the innermost layer, 25%)

In Comparative Example 1, the bottle was formed by using, as the polyethylene resin composition for forming the innermost layer, the high pressure process low-density polyethylene as the main polymer (A) and the bleeding additive (0.5% by weight). In this case, a period of as very long as 55 days was required until the slip-down property was exhibited, and was not industrially feasible. In Examples 1 to 3, on the other hand, the bottles were formed by using a blend of the high pressure process low-density polyethylene as the main polymer (A), the high pressure process low-density polyethylenes (B1a to B1c) having MFRs larger than that of (A) as the sub-polymer (B) and the bleeding additive (0.5% by weight), as the polyethylene resin composition for forming the innermost layer. The bottles exhibited their property in 4 days at the longest, and were within industrially feasible range.

In Examples 4 to 7, the bottles were formed by using a blend of the high pressure process low-density polyethylene as the main polymer (A), the high pressure process low-density polyethylene (B1a) having an MFR larger than that of (A) and metallocene-type low-density polyethylene (B2) as the sub-polymer (B), and the bleeding additive (0.5% by weight), as the polyethylene resin composition for forming the innermost layer. The bottles exhibited their property in periods of as very short as 1 to 3 days, and were industrially very feasible.

In Examples 8 and 9, the same composition as that of Example 6 was used as the polyethylene resin composition for forming the innermost layer, and the ratio of the innermost layer was changed to evaluate the period until the slip-down property was exhibited. When this composition was used, it was learned that the period until the slip-down property was exhibited was not at all affected by a reduction in the ratio of the innermost layer of the multi-layer bottle. Namely, upon using this composition, the slip-down property could be exhibited in only one day despite the ratio of the innermost layer was reduced, and the same property could be exhibited by the use of the composition even in small amounts.

In Examples 10 and 11, use was made of a blend of the high pressure process low-density polyethylene as the main polymer (A), the high pressure process low-density polyethylene (B1a) having an MFR larger than that of (A) and metallocene-type low-density polyethylene (B2) as the sub-polymer (B), and a decreased amount of the bleeding additive, as the polyethylene resin composition for forming the innermost layer. The period until the slip-down property was exhibited extended to some extent with a decrease in the amount of the bleeding additive. As compared to Comparative Example 1, however, the slip-down property was exhibited in obviously shortened periods of time, which was within industrially feasible range.

TABLE 2

|  | A *1 MFR = 0.3 | B1a *1 MFR = 7 | B1b *1 MFR = 20 | B1c *1 MFR = 50 | B2 *2 MFR = 22 | Bleeding additive Ethylene-bisoleic acid | Ratio of inner layer (%) | Period till property exhibits (days) |
|---|---|---|---|---|---|---|---|---|
| Ex. 1 | 95 | 4.5 |  |  |  | 0.5 | 25 | 3 |
| Ex. 2 | 95 |  | 4.5 |  |  | 0.5 | 25 | 4 |
| Ex. 3 | 95 |  |  | 4.5 |  | 0.5 | 25 | 4 |
| Ex. 4 | 85 | 4.5 |  |  | 10 | 0.5 | 25 | 3 |
| Ex. 5 | 75 | 4.5 |  |  | 20 | 0.5 | 25 | 1 |
| Ex. 6 | 65 | 4.5 |  |  | 30 | 0.5 | 25 | 1 |
| Ex. 7 | 55 | 4.5 |  |  | 40 | 0.5 | 25 | 1 |
| Ex. 8 | 65 | 4.5 |  |  | 30 | 0.5 | 19 | 1 |
| Ex. 9 | 65 | 4.5 |  |  | 30 | 0.5 | 14 | 1 |
| Ex. 10 | 67 | 2.7 |  |  | 30 | 0.3 | 14 | 4 |
| Ex. 11 | 69 | 0.9 |  |  | 30 | 0.1 | 14 | 12 |
| Comp. Ex. 1 | 99.5 |  |  |  |  | 0.5 | 26 | 55 |

In Table, values of A, B and bleeding additive are all % by weight.
*1: High-pressure low-density polyethylene
*2: Metallocene low-density polyethylene

The invention claimed is:

1. A direct-blow-formed container having an inner surface or an outer surface formed by using a polyethylene resin composition, wherein,
   said polyethylene resin composition contains a main polymer (A) in an amount of 55 to 80% by weight, a sub-polymer (B) in an amount of not less than 2% by weight but less than 45% by weight and a bleeding additive in amount of not less than 0.1% by weight;
   said main polymer (A) is a high pressure process low density polyethylene having a density of not less than 0.910 g/cm³ but less than 0.930 g/cm³ and an MFR (190° C.) of not less than 0.1 g/10 min. but le/s than 5.0 g/10 min.;
   said sub-polymer (B) is composed of a high pressure process low-density polyethylene (B1) having an MFR (190° C.) of 5 to 100 g/10 min, and a metallocene-type low-density polyethylene (B2) having a density of 0.880 to 0.905 g/cm³,
   said high pressure process low-density polyethylene (B1) being contained in amount of 0.5 to 10% by weight and said metallocene-type low-density polyethylene (B2) being contained in an amount of not more than 44.5% by weight; and
   said bleeding additive has a molecular weight of not less than 400.

2. The direct-blow formed container according to claim 1, wherein said bleeding additive is a fatty acid amide.

* * * * *